(12) United States Patent
Rowell

(10) Patent No.: US 10,171,141 B2
(45) Date of Patent: Jan. 1, 2019

(54) HYBRID BEAM-FORMING ANTENNA ARRAY USING SELECTION MATRIX FOR ANTENNA PHASE CALIBRATION

(71) Applicant: ROSS SCIENCES LIMITED, Hong Kong (HK)

(72) Inventor: Corbett Rowell, Hong Kong (HK)

(73) Assignee: ROSS SCIENCES LIMITED, Hong Kong (HK)

( * ) Notice: Subject to any disclaimer, the term of this patent is extended or adjusted under 35 U.S.C. 154(b) by 0 days.

(21) Appl. No.: 15/558,197

(22) PCT Filed: Mar. 14, 2017

(86) PCT No.: PCT/CN2017/000234
§ 371 (c)(1),
(2) Date: Sep. 14, 2017

(87) PCT Pub. No.: WO2017/157087
PCT Pub. Date: Sep. 21, 2017

(65) Prior Publication Data
US 2018/0175916 A1    Jun. 21, 2018

Related U.S. Application Data

(60) Provisional application No. 62/307,582, filed on Mar. 14, 2016.

(51) Int. Cl.
*H04B 7/0452* (2017.01)
*H04B 7/06* (2006.01)
*H04B 7/0417* (2017.01)

(52) U.S. Cl.
CPC ......... *H04B 7/0452* (2013.01); *H04B 7/0421* (2013.01); *H04B 7/0617* (2013.01); *H04B 7/0695* (2013.01)

(58) Field of Classification Search
None
See application file for complete search history.

(56) References Cited

U.S. PATENT DOCUMENTS 7,151,951 B2 *  12/2006  Goransson ........... H04B 7/0408
                                                     455/562.1
9,445,282 B2 *  9/2016   Chen ................... H04B 7/0695
(Continued)

OTHER PUBLICATIONS

J. Jeganathan et. al., "Space Shift Keying Modulation for MIMO Channels", IEEE Transactions on Wireless Communications, 2009, vol. 8 (7), p. 3692-3703.

*Primary Examiner* — Hicham B Foud
(74) *Attorney, Agent, or Firm* — Idea Intellectual Limited; Margaret A. Burke; Sam T. Yip

(57) ABSTRACT

A hybrid beam-forming antenna array used in a MU-MIMO communication system, comprising a single digital beam-former connected to M number of passive beam-former sub-arrays and M number of passive beam-former sub-arrays. Each of the passive beam-former sub-arrays comprising a RF transceiver feeding a single RF chain, a 2N-inputs-2N-outputs selection matrix having all its inputs connected to the single RF chain output, and 2N number of antennas each connected to and fed by one of the outputs of the selection matrix. The digital beam-former thereof is feeding each of the RF transceivers of the passive beam-former sub-arrays. The selection matrix thereof has no power-consuming element or external control, and configured to be fed with an RF signal at one or more of its inputs and produce 2N number of separate RF signal beams with progressive phase distribution at its outputs. In addition, the hybrid beam-forming antenna array has no antenna calibration network.

8 Claims, 3 Drawing Sheets

(56) References Cited

U.S. PATENT DOCUMENTS

| | | | |
|---|---|---|---|
| 2007/0285312 A1* | 12/2007 | Gao | H01Q 1/246 342/367 |
| 2012/0230380 A1* | 9/2012 | Keusgen | H04B 7/0695 375/227 |
| 2013/0229308 A1* | 9/2013 | Pu | H01Q 3/40 342/373 |
| 2014/0341310 A1* | 11/2014 | Rahman | H04B 7/0408 375/260 |

* cited by examiner

HYBRID BEAM-FORMING ANTENNA ARRAY USING SELECTION MATRIX FOR ANTENNA PHASE CALIBRATION

CROSS-REFERENCE TO RELATED APPLICATIONS

This is a national phase application of PCT/CN2017/000234, filed on Mar. 14, 2017, which claims priority to the U.S. Provisional Patent Application No. 62/307,582, filed Mar. 14, 2016, the disclosure of which is incorporated herein by reference in its entirety.

FIELD OF THE INVENTION

The present invention relates generally to a massive multi-input multi-output (MIMO) communication system. More particularly, the present invention relates to a method and an apparatus of channel estimation in a multi-user massive MIMO (MU-MIMO) system.

BACKGROUND

The Fifth Generation (5G) wireless network has the potential to radically change the communication infrastructure and business models across a broad range of fronts. Among the many technological advances in 5G networks is a brand new radio interface unconstrained by previous designs. This interface may employ massive MIMO and beam-forming technologies in a single antenna array that can greatly increase spectral efficiency with spatial diversity while supporting multi-users with increased signal to interference noise ratio (SINR).

Due to various advantages such as large beam-forming gain and spatial multiplexing gain, and high spatial resolution, massive MIMO communications have attracted considerable interest for future deployment in next generation of wide area wireless communication systems. In a massive MIMO system, a transmitter often has a very large number (i.e. from about 10 to over 100) of transmit antenna elements. To achieve high data transmission rate, one way is to transmit multiple data streams simultaneously through multiple antennas to a user equipment (UE). For example in FIG. 1, four separate data streams, $d_1(t)$, $d_2(t)$, $d_3(t)$, and $d_4(t)$, one for each antenna element, are transmitted to a UE at the same time achieving four times the $d_1(t)$ data rate. Another way to achieve high data transmission rate is to use beam-forming where a single data stream is split into multiple copies with phase shifting. Each of the phase-shifted copies is transmitted from each antenna, forming a beam signal, to the UE.

In a MU-MIMO system, the use of beam-forming increases SINR and capacity for each user. However, with the use of beam-forming, antenna calibration is required because the beam-forming algorithm relies on the precise knowledge of the phase and amplitude of the radio frequency (RF) signal. Yet, each RF chain, which may comprise a number of integrated circuits (RFICs), power amplifiers, and ADC/DACs, has various phase and power amplifier performance that are affected by temperature variations, and the undesirable effects of microstrip line and mechanical tolerances. Absent any calibration, the phase difference between the RF chains can be as high as +/−20 degree. This is unacceptable as beam-forming can tolerate a maximum of only +/−2 degree phase difference. Thus, antenna calibration is needed to provide the amplitude and phase correction in the RF feeds to the antennas.

Existing solutions include non-adaptive calibration, which involves taking measurements of the beam signal from the antenna array using an external network analyzer and adjusting the amplitude and phase for correction in the RF feeds; however, this solution greatly complicates the system's operation infrastructure with ad hoc additional expensive equipment and procedures.

One adaptive calibration solution is to use a separate calibration circuitry (implemented with i.e. DSPs or FPGAs) and separate calibration transceiver for each RF chain. In this solution, each RF chain has a directional coupler attached at the port directly before the antenna's feeding network and the coupler is connected to a separate receiver network having the calibration circuitry with a feedback path to the RF chain. A pilot signal is sent through all RF chains and measurements are taken at the couplers as input to the receiver networks for determining the amplitude and phase correction. This solution is accurate, but expensive with many additional components, such as combiners and power splitters in the calibration circuitries, added to the RF chains.

Another adaptive calibration solution is to utilize the mutual coupling properties between the antennas to compute the phase differences among them. However, because the return RF chains are not the same as the forward RF chains due to the presence of active devices, this solution is relatively less accurate, though less expensive than the aforesaid solutions.

In addition to the problems presented by antenna calibration, present beam-forming techniques also suffer the problem of excessive power consumption; for instance, in digital beam-forming (DBF), the RF chains, which must include numerous RFICs, power amplifiers, and ADC/DACs, consume large amount of power; and in analog beam-forming (ABF), the variable phase-shifters in the RF chains are very lossy.

SUMMARY

The present invention provides a selective beam-forming sub-arrays aiming to mitigate the antenna calibration and power consumption problems. In accordance with various embodiments of present invention, provided is one or more selective beam-forming sub-arrays employing hybrid beam-forming (HBF) with M digital beam-forming and $2^N$ antenna elements per sub-array for a total of M times $2^N$ antenna elements (forming a passive beam-forming network). Each sub-array contains a feeding network with $2^N$ inputs and $2^N$ outputs where each input is connected to all outputs, forming an antenna beam in a specified direction using only elements that do not require external power or control (i.e. diodes, switches, MEMs, etc.)

In accordance with one embodiment, the total antenna array power consumption is M times ($P_{DBF}$+0.5 dBm) where $P_{DBF}$ is the power consumption of the digital beam-former. There is no requirement of calibration network for each array. And the number of beams generated is M times $2^N$.

The advantages of the present invention include that the power consumption is reduced in comparison to other array architecture. With lower power consumption by the electronics, smaller heat sinks are allowed and in turn lower cost and packaging size are possible. The system complexity is also reduced due to the elimination of antenna calibration network.

BRIEF DESCRIPTION OF THE DRAWINGS

Embodiments of the invention are described in more detail hereinafter with reference to the drawings, in which.

DETAILED DESCRIPTION

In the following description, systems and methods of beam-forming in MU-MIMO systems are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
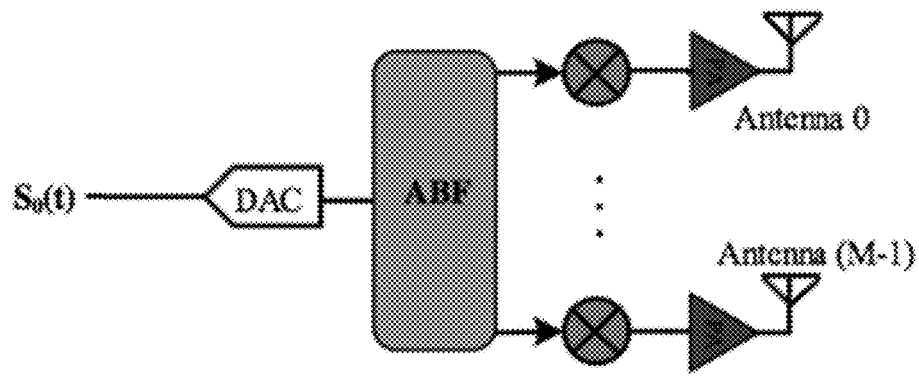
FIG. 1a depicts a schematic diagram of an analog beam-forming (ABF) architecture.
Figure 1B:
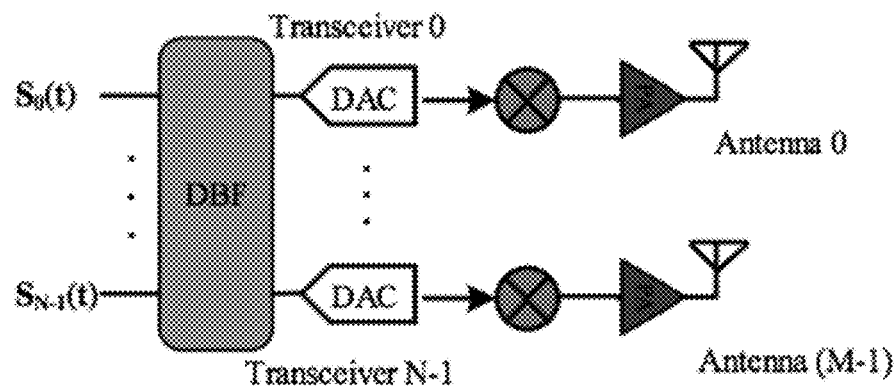
FIG. 1b depicts a schematic diagram of a digital beam-forming (DBF) architecture.
Figure 1C:
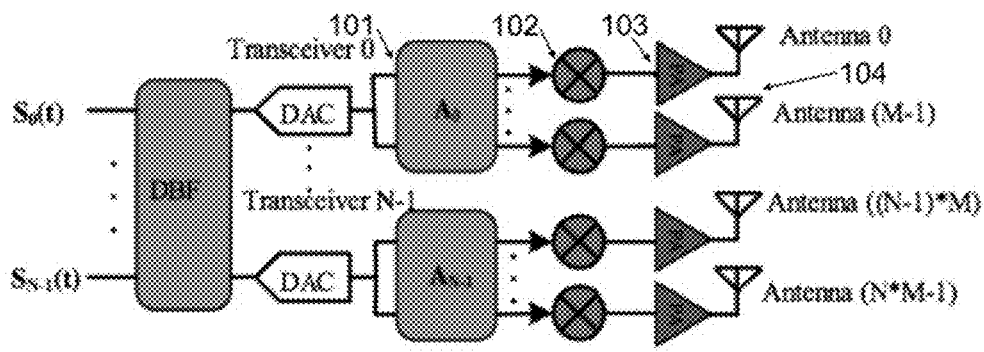
FIG. 1c depicts a schematic diagram of a hybrid beam-forming (HBF) architecture.

Referring to FIG. 1a. Analog beam-forming (ABF) has an architecture in which multiple antennas are connected to and fed by a single transceiver. The beam signals are formed using a separate power amplifier and a separate variable phase-shifter for each antenna to achieve the phase-shifting of each signal sent from the antenna. Referring to FIG. 1b. Digital beam-forming (DBF) has an architecture in which each antenna is connected and fed by a separate transceiver, and the beam signals are formed in baseband by beam-forming algorithms. Referring to FIG. 1c. Hybrid beam-forming (HBF) has an architecture in which each of n number of transceivers (a DBF architectural characteristic) is connected to and feeding M number of antennas (an ABF architectural characteristic). Thus, in the HBF architecture, each sub-array comprises of one of n number of transceivers, M number of antennas, M number of power amplifier, one for each of the antennas, and M number of variable phase-shifter, one for each of the antennas.

Figure 2:
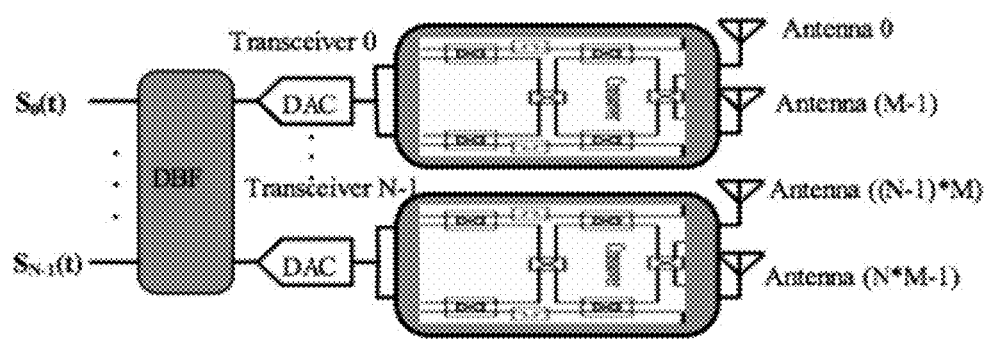
FIG. 2 depicts a schematic diagram of the improved hybrid beam-forming (HBF) architecture in accordance to various embodiments of the present invention.

Referring to FIGS. 1c and 2. The selective beam-forming sub-arrays in accordance with various embodiments of the present invention is used to improve the HBF architecture with a passive beam-forming (PBF) architecture. The improvement is based on that each of the analog beam-former sub-arrays (a transceiver 101, M number of antennas 104, M number of power amplifiers 103, one for each of the antennas, and M number of variable phase-shifters 102, one for each of the antennas) in the HBF architecture being replaced by a passive beam-former sub-array, turning the architecture as shown in FIG. 1c into the one shown in FIG. 2.

In various embodiments, each passive beam-former sub-array comprises a $2^N$ element Butler matrix in place of separate antenna feeds feeding $2^N$ number of antennas. A Butler matrix is a n-input-n-output signal-feeding network comprising primarily directional couplers and phase-shifters. It has been described in numerous printed publications including Butler et al., *Beam-Forming Matrix Simplifies Design of Electronically Scanned Antennas*, Electronic Design, volume 9, pp. 170-173, April, 1961; the content of which is incorporated herein by reference in its entirety. The passive beam-former sub-array generates the multiple antenna beams for a MU-MIMO system without the need of an antenna calibration network.

Figure 3:
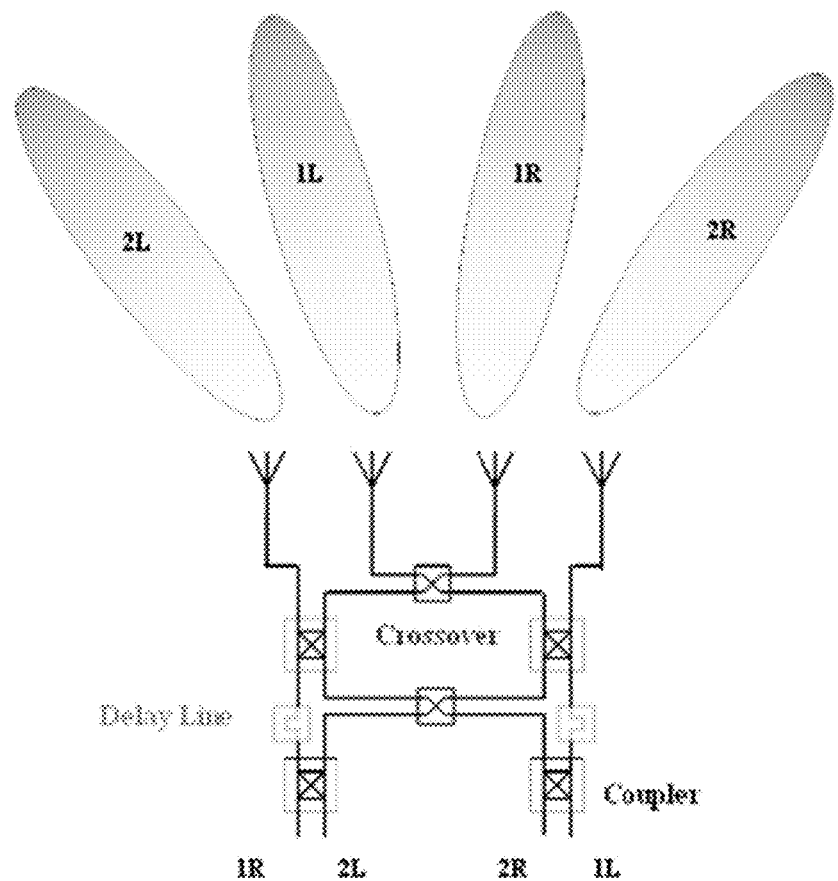
FIG. 3 illustrates a Butler matrix in MU-MIMO communication system.

A selection matrix is an antenna signal-feeding network containing n number of inputs and n number of outputs such that a RF signal entering one input exits several or all of the outputs. In various embodiments, a Butler matrix is employed as the selection matrix where a RF signal entering one input exits all outputs such that n separate RF signal beams with progressive phase distribution are produced at the outputs to cover the entire half-hemisphere in front of the antenna array. This is illustrated in FIG. 3. The advantage of using the Butler matrix is that there is no power-consuming element in the feeding network and that no external control is necessary. As such, the replacement of ABF with PBF in the improved HBF architecture simultaneously reduces power consumption and system complexity while eliminating the requirement for an antenna calibration network. In addition, all beams are transmitted simultaneously with beam selection occurring in the digital beam-former.

Figure 4:
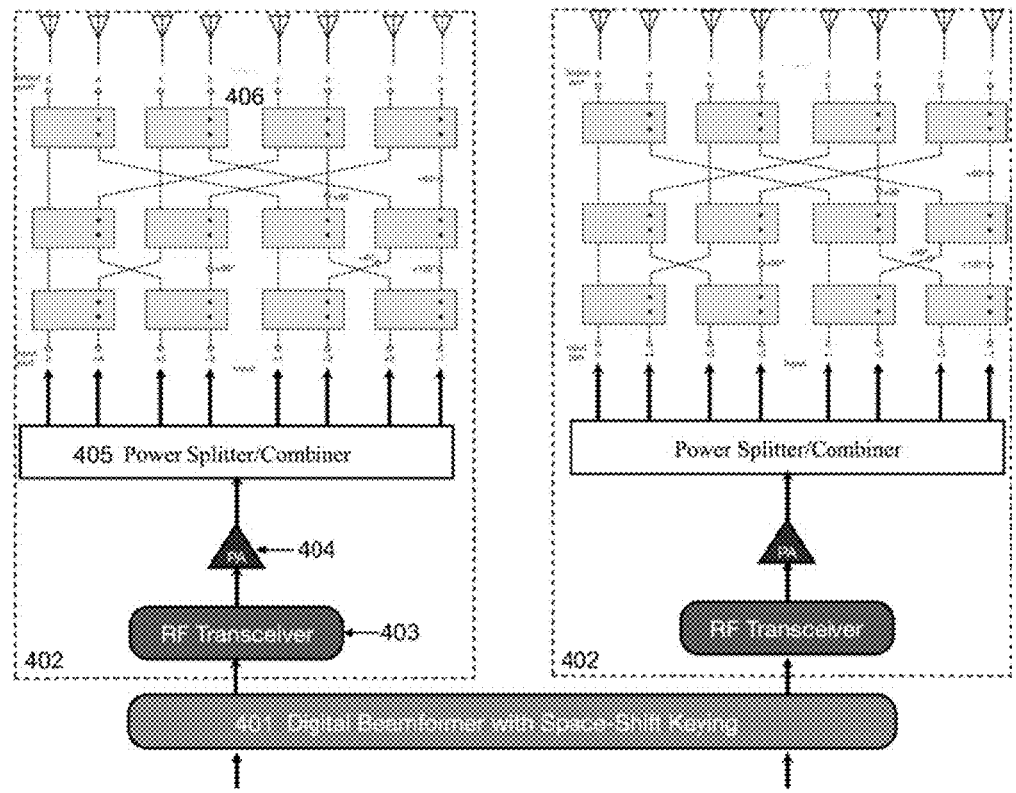
FIG. 4 depicts a schematic diagram of the improved hybrid beam-forming (HBF) architecture in accordance to one preferred embodiment of the present invention.

Referring to FIG. 4. In accordance to one preferred embodiment of the present invention, the improved HBF architecture comprises a single digital beam-former with space-shift keying modulation 401 connected to one or more (M number of) passive beam-former sub-arrays 402. Space-shift keying modulation has been described in numerous printed publication including Jeganathan et al., *Space Shift Keying Modulation for MIMO Channels*, IEEE Transactions on Wireless Communications, Vol. 8, No. 7, July 2009; the content of which is incorporated herein by reference in its entirety. Each passive beam-former sub-array comprises at least an RF transceiver 403 connected to a power amplifier 404 connected to a power splitter/combiner 405 connected to a $2^N$ element Butler matrix 406 feeding and receiving from $2^N$ number of antennas with each output of the Butler matrix 406 connected to one of the antennas. Shown in FIG. 4 is an improved HBF architecture with 8 (N=3) antennas in each passive beam-former sub-array.

Figure 5:
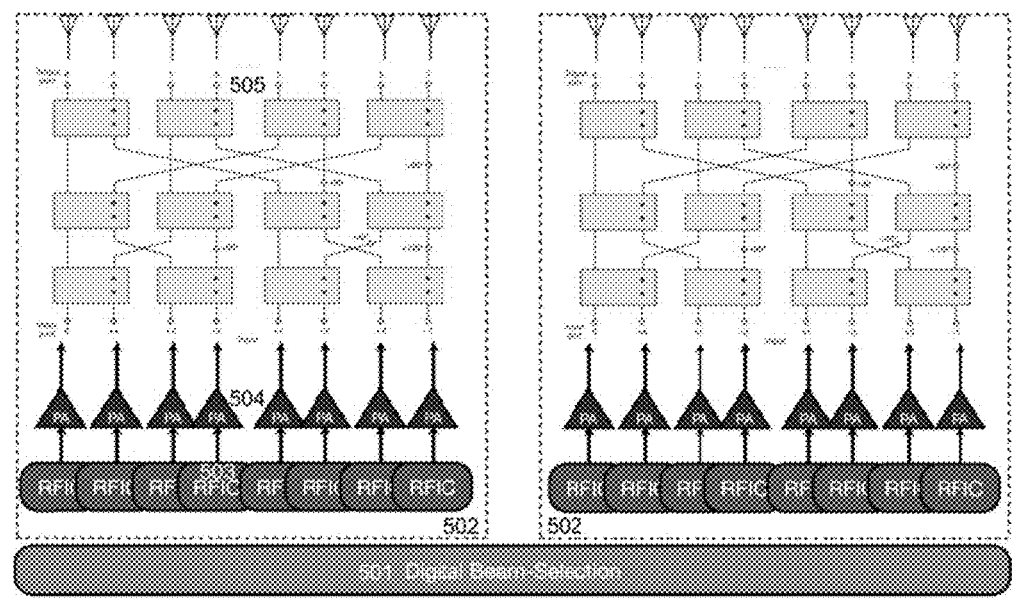
FIG. 5 depicts a schematic diagram of the improved hybrid beam-forming (HBF) architecture in accordance to another preferred embodiment of the present invention.

Referring to FIG. 5. In accordance to another preferred embodiment of the present invention, the improved HBF architecture comprises a digital beam-former with beam selection 501 connected to one or more (M number of) passive beam-former sub-arrays 502. Each passive beam-former sub-array comprises at least $2^N$ number of RF transceivers 503, each of the RF transceivers 503 is connected to a power amplifier 504 connected to one input of a $2^N$ element Butler matrix 505 feeding and receiving from $2^N$ number of antenna with each output of the Butler matrix 505 connected to one of the antennas. Shown in FIG. 5 is an improved HBF architecture with 8 (N=3) antennas in each passive beam-former sub-array.

In one preferred embodiment, the optimum number, from an energy efficiency perspective, of antennas and transceivers in the improved HBF architecture are 4 RF transceivers and 8 (N=3) antennas per RF transceiver respectively for a total of 32 antennas. Table 1 below compares the power consumptions of ABF, DBF, HBF, and the improved HBF architecture in MU-MIMO systems in accordance to the present invention.

TABLE 1

Power Consumption Comparison

| Sample (total 32 antennas) | Input power | Power Amplifier efficiency (=50%) | Phase shifter feeding network loss (=5 dB) | Butler matrix loss (=0.5 dB) | Output power |
|---|---|---|---|---|---|
| ABF (32 phase shifters) | 30 dBm | −15 dBm | −5 dBm | N/A | 10 dBm |
| DBF (32 power amplifiers) | 30 dBm *32 | −15 dBm * 32 | N/A | N/A | 15 dBm * 32 |
| HBF (4 analog beam-former sub-arrays with 8 antennas each) | 30 dBm * 4 | −15 dBm * 4 | −5 dBm * 4 | N/A | 10 dBm * 4 |
| Improved HBF (4 RF transceivers with 8 antennas each) | 30 dBm | −15 dBm | N/A | −0.5 dBm | ~15 dBm |

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A hybrid beam-forming antenna array used in a multi-user massive multi-input multi-output (MU-MIMO) communication system, comprising:
  a single digital beam-former connected to M number of passive beam-former sub-arrays, wherein M is an integer equal to or greater than 1;
  the M number of passive beam-former sub-arrays, each of the passive beam-former sub-arrays comprising:
    a radio frequency (RF) transceiver having an output connected to an input of a single RF chain;
    a $2^N$-inputs-$2^N$-outputs selection matrix having all its inputs connected to the single RF chain output; and
    $2^N$ number of antennas, each connected to and fed by one of the outputs of the selection matrix, wherein N is an integer equal to or greater than 0;
  wherein the single digital beam-former output is connected to and feeding the RF transceiver of the passive beam-former sub-arrays; and
  wherein the selection matrix has no power-consuming element and no external control, and configured to be fed with an RF signal at one or more of its $2^N$ number of inputs and produce $2^N$ number of separate RF signal beams with progressive phase distribution at its $2^N$ number of outputs; and
  wherein hybrid beam-forming antenna array has no antenna calibration network.

2. The hybrid beam-forming antenna array of claim 1, wherein the single RF chain comprising:
  a power splitter/combiner; and
  at least one of power amplifiers (PA), low noise amplifiers (LNA), filters, and mixers.

3. The hybrid beam-forming antenna array of claim 1, wherein the selection matrix is a $2^N$-element Butler matrix.

4. The hybrid beam-forming antenna array of claim 1, wherein M is 4 and N is 3 for a total of 32 antennas.

5. A hybrid beam-forming antenna array used in a multi-user massive multi-input multi-output (MU-MIMO) communication system, comprising:
  a single digital beam-former connected to M number of passive beam-former sub-arrays, wherein M is an integer equal to or greater than 1;
  the M number of beam-former sub-arrays, each of the passive beam-former sub-arrays comprising:
    $2^N$ number of radio frequency (RF) transceivers, each having an output connected to an input of each of $2^N$ number of RF chains;
    a $2^N$-inputs-$2^N$-outputs selection matrix having each of its inputs connected to each of the $2^N$ number of RF chains output; and
    $2^N$ number of antennas, each connected to and fed by one of the outputs of the selection matrix, wherein N is an integer equal to or greater than 1;
  wherein the single digital beam-former output is connected to and feeding each of the RF transceivers of each of the passive beam-former sub-arrays; and
  wherein the selection matrix has no power-consuming element and no external control, and configured to be fed with an RF signal at one or more of its $2^N$ number of inputs and produce $2^N$ number of separate RF signal beams with progressive phase distribution at its $2^N$ number of outputs; and wherein hybrid beam-forming antenna array has no antenna calibration network.

6. The hybrid beam-forming antenna array of claim 5, wherein each of the RF chains comprising at least one of power amplifiers (PA), low noise amplifiers (LNA), filters, and mixers.

7. The hybrid beam-forming antenna array of claim 5, wherein the selection matrix is a $2^N$-element Butler matrix.

8. The hybrid beam-forming antenna array of claim 5, wherein M is 4 and N is 3 for a total of 32 antennas.

* * * * *